3,576,861
(ARYLOXYARYL)ARYLPHOSPHINE HALIDES
Iral B. Johns, Marblehead, Mass., assignor to Monsanto Research Corporation, St. Louis, Mo.
No Drawing. Filed May 28, 1965, Ser. No. 459,931
Int. Cl. C07f 9/52
U.S. Cl. 260—543          3 Claims

ABSTRACT OF THE DISCLOSURE (Aryloxyaryl) arylphosphorus compounds of the following formula:

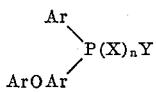

where Ar is an aromatic hydrocarbon radical free of aliphatic unsaturation, of from 1–6 carbon atoms; Y is a halogen, cyano or hydroxy goup; X is oxygen or sulfur, and X is sulfur when Y is cyano and X is oxygen where Y is hydroxy and $n$ is 0 or 1 but 0 when Y is halogen. Specific compounds representative of the class claimed include chloro (p-phenoxy phenyl) phenyl phosphine, cyano (p-phenoxy phenyl) phenyl phosphine and cyano (p-phenoxy phenyl) phenyl phosphine sulfide.

---

This invention relates to new compounds, and more particularly, provides new phosphorus compounds.

The presently provided compounds are characterized by the simultaneous presence of an aryl and an aryloxyaryl radical attached to a tri- or pentavalent phosphorus atom, and include phosphorus cyanides, halides, cyanophosphine sulfides, and phosphinous and phosphinic acids, as illustrated by the following formula

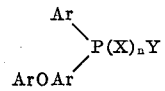

in which each Ar is an aromatic hydrocarbon radical, free aliphatic unsaturation, of from 6 to 12 carbon atoms, Y is a substituent selected from the class consisting of halogen, cyano and hydroxy groups, X is a chalkogen element having an atomic weight below 35 (i.e., selected from the class consisting of O and S), which is S when Y is cyano and O when Y is hydroxy, and $n$ is an integer of from 0 to 1, which is 0 when Y=halogen. By an aromatic radical is meant a radical including at least one benzene ring, and which may also include aliphatic radicals; such aromatic radicals are designated by the term "aryl" herein.

The groups of compounds included in the presently claimed class are interrelated as shown in the following synthesis scheme, from which it will be evident that these compound groups are generally intermediates and products involved in the synthesis of (aryloxyaryl) arylcyanophosphines and their chalkogenides. (The acids, which are an exception to this, are direct derivatives of such intermediates.) The stated cyanophosphine compounds are useful in preparation of poly(nitrilomethylidynes) as described in my concurrently filed copending application, Ser. No. 459,874, now U.S. Pat. 3,410,809.

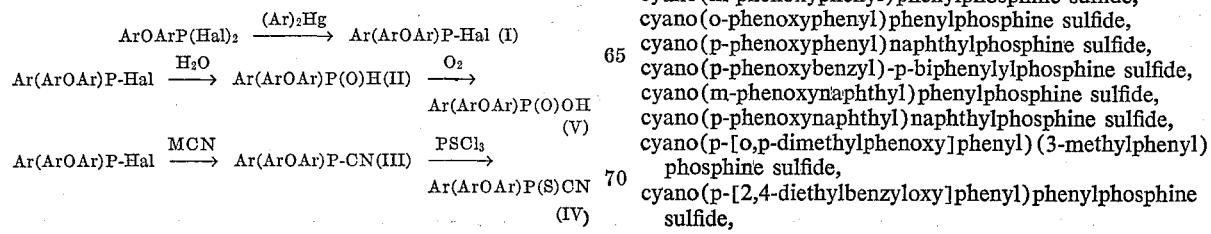

where Ar and X are as defined above, Hal is a halogen atom of atomic weight below 130, and M is a monovalent metal ion such as Ag or Li.

As the foregoing reaction scheme indicates, novel halo (aryloxyaryl)arylphosphines are provided by this invention, such compounds being prepared, for example, by the reaction

Exemplary of this group of compounds are, for example, chloro(p-phenoxy)phenylphosphine,
bromo(p-phenoxyphenyl)phenylphosphine,
fluoro(m-phenoxyphenyl)phenylphosphine,
bromo(o-phenoxyphenyl)phenylphosphine,
chloro(p-phenoxyphenyl)naphthylphosphine,
chloro(p-phenoxyphenyl)-p-biphenylylphosphine,
bromo(m-phenoxynaphthyl)phenylphosphine,
iodo(p-naphthoxyphenyl)phenylphosphine,
chloro(4-o-tolyloxyphenyl)phenylphosphine,
chloro(4-o-tolyloxybenzyl)phenylphosphine,
chloro(p-phenoxyphenyl)benzylphosphine,
bromo(p-phenoxyphenyl)(t-butylphenyl)phosphine,
chloro(p-phenoxyphenyl)phenethylphosphine,
iodo(p-phenoxy-o-methylphenyl)phenylphosphine and so forth.

The groups of phosphine halides provided as described hereinabove are useful starting materials for the preparation of, alternatively, cyanophosphines and phosphinous acids.

The novel (aryloxyaryl)aryl cyanophosphines provided by this invention, prepared, for example, by the reaction

are exemplified, for example, by cyano(p-phenoxyphenyl)phenylphosphine,
cyano(m-phenoxyphenyl)phenylphosphine,
cyano(o-phenoxyphenyl)phenylphosphine,
cyano(p-phenoxyphenyl)phenylphosphine,
cyano(p-phenoxyphenyl)naphthylphosphine,
cyano(p-phenoxyphenyl)-p-biphenylylphosphine,
cyano(m-phenoxynaphthyl)phenylphosphine,
cyano(p-phenoxynaphthyl)benzylphosphine,
cyano(p-2,4-xylyloxyphenyl)phenylphosphine,
cyano(p-benzyloxyphenyl)biphenylphosphine,
cyano(p-benzoyloxyphenyl)biphenylylphosphine,
cyano(p-phenoxy-o-ethylphenyl)phenylphosphine,
cyano(p-phenoxyl)(isopropylphenyl)phosphine,
phine and so forth.

The group of presently provided cyanophosphine sulfides can be prepared from a cyanophosphine, of the nature stated immediately hereinabove. This reaction is illustrated for example, by the equation

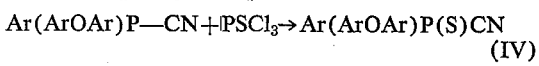

Exemplary of this group of compounds are, for example, cyano(p-phenoxyphenyl)phenylphosphine sulfide,
cyano(m-phenoxyphenyl)phenylphosphine sulfide,
cyano(o-phenoxyphenyl)phenylphosphine sulfide,
cyano(p-phenoxyphenyl)naphthylphosphine sulfide,
cyano(p-phenoxybenzyl)-p-biphenylylphosphine sulfide,
cyano(m-phenoxynaphthyl)phenylphosphine sulfide,
cyano(p-phenoxynaphthyl)naphthylphosphine sulfide,
cyano(p-[o,p-dimethylphenoxy]phenyl)(3-methylphenyl)
  phosphine sulfide,
cyano(p-[2,4-diethylbenzyloxy]phenyl)phenylphosphine
  sulfide, cyano(pphenoxybenzyl)phenethylphosphine sulfide,
cyano(p-phenoxyphenyl)(t-butylphenyl)phosphine sulfide,
cyano(p-phenoxybenzyl)phenethylphosphine sulfide, and the like.

The novel acids provided by the present invention are phosphinous and phosphinic acids of the structures

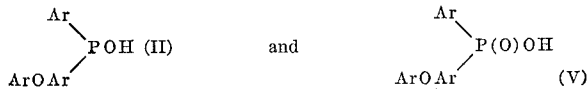

and are derived from the novel aryl(aryloxyaryl)halophosphines of this invention by hydrolysis and oxidation.

The hydrolysis of the aryl(aryloxyaryl)halophosphines to produce phosphinous acids is illustrated by the equation:

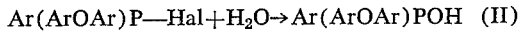

The oxidation of such phosphinous acids is effected, for example, as illustrated by the following equation

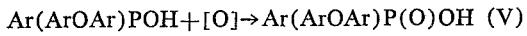

The overall reaction, if desired, can conveniently be accomplished without isolation of the phosphinous acid, by conducting the hydrolysis in the presence of an oxidizing agent such as air.

Exemplary of the presently provided phosphinous and phosphinic acids are (p-phenoxyphenyl)phenylphosphinic acid, (p-phenoxyphenyl)phenylphosphinous acid, (m-phenoxyphenyl)phenylphosphinic acid, (o-phenoxyphenyl)phenylphosphinous acid, (p-phenoxyphenyl)naphthylphosphinic acid, (p-phenoxyphenyl)-p-biphenylylphosphinic acid, (m-phenoxynaphthyl)phenylphosphinous acid, (p-naphthoxynaphthyl)phenylphosphinic acid, (4-o-tolyloxyphenyl)phenylphosphinous acid, (p-phenoxybenzyl)phenylphosphinic acid, (p-phenoxyphenyl)benzylphosphinous acid, (p-phenoxyphenyl)(t-butylphenyl)phosphinic acid, (p-phenoxyphenyl)(3-phenylpropyl)phosphinic acid, (p-phenoxy-o-methylphenyl)phenylphosphinous acid, (p-phenoxymethylphenyl)(2,4-diisopropylphenyl)phosphinic acid, and so forth.

The foregoing discussion has indicated, in equation form, the general methods of synthesis of the presently provided compounds. The starting materials for preparation of the halo(aryloxyaryl)arylphosphines are dihalo-(aryloxyaryl)phosphines, which are known compounds. Exemplary of such materials are, for example, dichloro-(phenoxyphenyl) phosphine, dibromo (phenoxyphenyl) phosphine, dichloro(m-phenoxynaphthyl)phosphine, dichloro(p-naphthoxyphenyl)phosphine, diiodo(4 - o-tolyloxybenzyl)phosphine, dichloro(p - [t - butylphenoxy] phenyl)phosphine, dichloro(p - phenoxy - o - methylphenyl)phosphine, and the like. To provide the aryloxyaryl)arylphosphine halides, the aryloxyphosphine dihalide is reacted with a diaryl mercury compound. Exemplary of these are, for example, diphenylmercury, dibiphenylmercury, dinaphthylmercury, dibenzylmercury, bis-(t-butylphenyl)mercury, diphenethylmercury, and so forth.

In conducting this reaction, the reactants will be generally contacted in proportions such that the phosphorous compound is present in excess, compared to the mercury compound, to avoid the possibility of displacing both halogen atoms from the phosphorus compound. However, it has been found that as much as two thirds of a mole of the mercury compound per mole of the dichlorophosphine compound can be present in the reaction mixture without excessive production of undesired products such as a triorganophosphine, and with suitable procedures, it may be possible to use even higher ratios, such as equimolar ratios. The reaction is carried out under anhydrous conditions. Presence of an inert reaction medium such as an organic solvent or diluent is not essential, although such a liquid reaction medium may be employed if desired, such as benzene, toluene, diethylbenzene, and the like. Generally, for reasonably short reaction times, the reaction mixture will be heated. Suitable temperatures are generally above 100° C. and may range considerably higher up to 250° C., for example. Temperatures of about 200–250° C. are usually suitable.

The above described procedure provides the starting material from which further of the novel compounds of this invention may be produced. To provide a cyano(aryloxyaryl)arylphosphine, the halo(aryloxyaryl)arylphosphine is reacted with a metal cyanide. Useful cyanides include, for example, metal cyanides such as silver cyanide, lithium cyanide, potassium cyanide, and so forth. Silver cyanide is advantageous because of the insolubility of the silver chloride produced by the reaction.

In conducting the reaction of the halo(aryloxyaryl)arylphosphine with a metal cyanide, either component may be present in excess, ranging up to as much as 5 moles per mole of the other reactant, but it is usually convenient and suitable to use approximately equimolar quantities of the two reactants. Presence of an inert organic solvent or diluent during the reaction is usually advantageous. Exemplary of such solvents are, for example, benzene, toluene, hexane, ethylene dichloride, the dimethyl ether of diethylene glycol, cyclohexane, and so forth. The temperatures of the reaction may vary from down to about 0° C. up to elevated temperatures as high as say 200° or 250° C., but it is usually possible to conduct the reaction with sufficient efficiency and rapidity at moderate temperatures, in the range of 50–150° C.

The reaction of phosphorus thiochloride with a cyano-(aryloxyaryl)arylphosphine provides the corresponding cyanophosphine sulfide. In carrying out this reaction, the organophosphorus compound is contacted with the phosphorus thiochloride, while phosphorus trichloride is evolved from the reaction mixture. Usually equimolar quantities of the respective reactants are suitably employed, although if desired an excess of either reactant, ranging up to say 2 moles per mole of the other, may be used. It is ordinarily advantageous to heat the reaction mixture to above room temperature, although the reaction temperature may vary widely, from down to 0° C. up to temperatures as high as above 250° C., if desired. In general the range of 125–175° C. is usually suitable, where the reaction is conducted under atmospheric pressure.

For conversion of the presently provided halo(aryloxyaryl)arylphosphines to the corresponding phosphinous and phosphinic acids, the phosphorus compound is hydrolyzed and oxidized. Contact with a large excess of water is generally suitable, without more, to produce the hydrolysis. The boiling temperature is usually suitable; the reaction will proceed, though more slowly, at lower temperatures such as room temperature or below, and if desired, can be accelerated by conducting the reaction under pressure, to increase the boiling point of the aqueous reaction medium.

If care is taken to exclude oxidizing agents, the phosphinous acid can be isolated as the product of the hydrolysis. This is an oxygen-sensitive compound which is readily oxidizable to the corresponding phosphinic acid. To produce such oxidation, any of a variety of usual oxidizing agents may be used, such as oxygen, hydrogen peroxide, potassium permanganate, and so forth; oxygen such as oxygen of the air, dissolved in water, is convenient and will usually be preferred. To effect such oxidation, the phosphinous acid can for example be boiled with a large excess of water in a vessel open to the air; air can be bubbled through an aqueous solution or suspension of the acid; the acid can be mixed with aqueous hydrogen peroxide, and so forth. The temperature of the reaction will depend on the oxidizing power of the oxidizing agent selected: it may be desirably be as low as 0° C. when a more powerful reagent such as $H_2O_2$ is employed, particularly when this is more concentrated than, say, 3%, and it may desirably be as high as about 100° C. when boiling in water open to the air is used to affect the oxidation.

In each of the above-discussed reactions, the pressure may range from subatmospheric pressures as low as 0.05 mm. Hg up to superatmospheric pressures as high as 5000 p.s.i.g., if desired, but usually ambient pressures are suitable. Also, in each case, the reaction product is isolated by usual means, such as distillation, extraction, filtration, and so forth.

The presently provided novel (aryloxyaryl)arylphosphine compounds are generally stable materials, which range from oils to solid crystalline materials, and are useful for a wide variety of agricultural and industrial purposes. For example, the halides and cyanides provided hereby are intermediates for the production of the presently provided cyano(aryloxyaryl)arylphosphine sulfides, which can be converted to polymers as noted hereinabove, by high pressure condensation as described in my concurrently filed copending application Ser. No. 459,874, now U.S. Pat. 3,410,809. The stated poly(nitrilomethylidynes) may be employed, for example, as functional fluids, for lubrication, transfer of heat or other high temperature functional fluid applications. The present compounds may also be employed if desired as agricultural toxicants, to produce kill of vegetation, insects, microbiological organisms such as bacteria and fungi, insects such as the house fly, army worm larvae (*Prodenia eridania*) and the like.

The invention is illustrated but not limited by the following examples.

EXAMPLE 1

This example describes the preparation of a halo (aryloxyaryl)arylphosphine.

A mixture of 100 grams (g.) (0.37 mole) of dichloro-p-phenoxyphenylphosphine and 50 g. of diphenylmercury (0.14 mole) is heated, under nitrogen, for four hours at 210–215° C. The reaction mixture is cooled, triturated with several 150 milliliter (ml.) portions of warm ligroin, and the resulting mixture is filtered. The filtrate is distilled to recover 26.0 g. of chloro(p-phenyloxyphenyl)phenylphosphine, b. 162–164° C./0.07 mm., $n_d^{25}$ 1.6472, $d_4^{24}$ 1.2213. The elemental analysis corresponds to the assigned structure of $C_{18}H_{14}ClOP$.

EXAMPLE 2

This example describes another preparation of a halo (aryloxyaryl)arylphosphine.

The procedure of Example 1 is repeated, except that the amount of the diphenylmercury component is increased to 81 g. (0.23 mole), and the reaction mixture is heated for two hours, with very rapid mechanical stirring. Extraction with petroleum ether and then benzene yields chloro(p-phenoxyphenyl)phenylphosphine, $n_d^{26}$ 1.6484.

EXAMPLE 3

This example illustrates the preparation of a cyano (aryloxyaryl)arylphosphine.

A mixture of 15 g. (0.11 mole) of silver cyanide with 31 g. (0.1 mole) of chloro(p-phenoxyphenyl)phenylphosphine in 125 ml. of anhydrous benzene is refluxed overnight. The supernatant layer is removed by decanting under nitrogen, and the residual silver chloride is washed with anhydrous benzene, the washings being added to the main decantate. Fractional distillation of the resulting liquid yields cyna(p-phenoxxyphenyl)phenylphosphine, b. 168–170° C./0.05 mm., $n_d^{25}$ 1.6353, $d_4^{24}$ 1.1725. The elemental analysis of the compound corresponds to the assigned structure of $C_{19}H_{14}NOP$.

EXAMPLE 4

This example illustrates the preparation of a cyano (aryloxyaryl)arylphosphine chalkogenide.

A mixture of 26 g. (0.14 mole) of phosphorus thiochloride is heated with 43 g. (0.14 mole) of cyano(p-phenoxyphenyl)phenylphosphine at 140° C. bath temperature, until the distillation of phosphorus trichloride has ceased. Distillation of the residual liquid at 174–176° C./0.02 mm. provides cyano(p-phenoxyphenyl)phenylphosphine sulfide as a heavy yellow oil, $n_d^{25}$ 1.6576, having an elemental analysis corresponding to the assigned structure of $C_{19}H_{14}NOPS$.

A lead capsule enclosing 6.7 g. of the cyano(p-phenoxyphenyl)phenylphosphine sulfide is placed in steel pressure bomb cylinder, surrounded by oil, and the pressure in the cylinder is raised to 7500 atmospheres while the bomb is heated at 275° C. for two hours. The product recovered, in quantitative yield, is a jet black condensation product which is completely soluble in warm benzene. Addition of petroleum ether to the cooled benzene solution precipitates a dark brown solid melting at 120–130° C., which is a polynitrilomethylidyne in which each —C=N— has a (p-phenoxyphenyl)phenylphosphinothioic substituent. A molecular weight determination by the freezing point depression of benzene gives a value of 1635, which corresponds to a degree of polymerization of approximately 5. The polynitrilomethylidyne product may be employed, for example, as a functional fluid, in areas such as high temperature lubrication or the like.

EXAMPLE 5

This example illustrates the preparation of an (aryloxyaryl)arylphosphinic acid in accordance with this invention.

A mixture of 2 grams of chloro(p-phenoxyphenyl) phenylphosphine with excess water is boiled for several hours and then let stand overnight. The cooled reaction mixture contains a powdery white solid which is filtered off, dried, and recrystallized from benzene and petroleum ether. The product is (p-phenoxyphenyl)phenylphosphinic acid, m. 157–158° C., having an elemental analysis corresponding to the assigned structure $C_{18}H_{15}O_3P$.

While the invention has been described with particular reference to specific preferred embodiments thereof, it will be appreciated that modifications and variations can be made without departing from the scope of the invention, as disclosed herein, which is limited only as described in the appended claims.

What is claimed is:
1. A compound of the formula

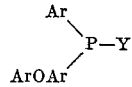

in which each Ar is an aromatic hydrocarbon radical of from 6 to 12 carbon atoms, free of aliphatic unsaturation, Y is a halogen.

2. A halo(aryloxyaryl)arylphosphine of the formula Ar(ArOAr)P—Hal in which each Ar is an aromatic hydrocarbon radical free of aliphatic unsaturation and containing from 6 to 12 carbon atoms, and Hal is a halogen atom having an atomic weight below 130.

3. Chloro(p-phenoxyphenyl)phenylphosphine.

References Cited

UNITED STATES PATENTS

| | | | |
|---|---|---|---|
| 3,408,390 | 10/1968 | Jungermann | 260—502.4 |
| 3,057,917 | 10/1962 | Maier | 260—543 |
| 2,724,725 | 11/1955 | Craig et al. | 260—543P |

LORRAINE A. WEINBERGER, Primary Examiner

E. J. GLEIMAN, Assistant Examiner

U.S. Cl. X.R.
260—500.5, 606.5